(12) United States Patent
Indo

(10) Patent No.: US 6,948,103 B2
(45) Date of Patent: Sep. 20, 2005

(54) WATCHDOG TIMER AND METHOD FOR DETECTING ABNORMAL OPERATION OF COMPUTER, AND COMPUTER INCLUDING THE TIMER

(75) Inventor: Seiya Indo, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 570 days.

(21) Appl. No.: 10/028,111

(22) Filed: Dec. 20, 2001

(65) Prior Publication Data

US 2002/0083375 A1 Jun. 27, 2002

(30) Foreign Application Priority Data

Dec. 22, 2000  (JP) ........................................ 2000-390716

(51) Int. Cl.[7] .............................................. G06F 11/00
(52) U.S. Cl. ............................. 714/51; 715/23; 715/25; 715/55
(58) Field of Search ............................. 714/51, 55, 23, 714/25

(56) References Cited

U.S. PATENT DOCUMENTS

| | | | |
|---|---|---|---|
| 4,752,930 A | | 6/1988 | Kitamura et al. |
| 4,866,713 A | * | 9/1989 | Worger et al. ................. 714/55 |
| 5,541,943 A | * | 7/1996 | Niescier et al. ............. 714/815 |
| 5,864,663 A | * | 1/1999 | Stolan .......................... 714/55 |
| 6,260,162 B1 | * | 7/2001 | Typaldos et al. ............. 714/55 |
| 6,560,726 B1 | * | 5/2003 | Vrhel et al. .................. 714/55 |

FOREIGN PATENT DOCUMENTS

| | | |
|---|---|---|
| DE | 32 07 120 | 9/1983 |
| JP | 61-62947 | 3/1986 |
| JP | S61-296443 | 12/1986 |
| JP | S63-41951 | 2/1988 |

OTHER PUBLICATIONS

Nirmal Saxena, et al., "Error Detection and Handling in a Superscalar, Specualtive Out–of–Order Execution Processor System", # XP 000573655, IEEE, pp. 464–470, (1995).

P. Charpentier, "Le Chien de Garde Appplique au Micorprocesseur", Electornique vol. No.: 24, pp. 53–59, (19930.

* cited by examiner

Primary Examiner—Robert Beausoliel
Assistant Examiner—Emerson Puente
(74) Attorney, Agent, or Firm—Scully, Scott, Murphy & Presser

(57) ABSTRACT

A counter counts pulses of a clock generated by an oscillator. A control register clears the counted value, in response to a reset signal sent from an external circuit. In the case where the counted value exceeds a limit value, an output control circuit outputs a reset signal for instructing to execute the reset process, to the external circuit. This reset signal is provided also to the control register. The control register controls the counter to count the pulses of the clock, in response to the reset signal. Then, abnormal operations occurring in the external circuit during the execution of the reset process can be detected.

9 Claims, 10 Drawing Sheets

|   | ABNORMAL OPERATION | FACTOR |
|---|---|---|
| A | · TRANSISTOR (Tr) DOES NOT OPERATE<br>· CLOCK FOR WDT IS NOT PROVIDED | · BREAKAGE OF POWER SOURCE LINE<br>· BREAKAGE OF OSCILLATOR |
| B | · Tr OPERATES<br>· CLOCK FOR WDT IS PROVIDED<br>· SOFTWARE DOES NOT RUN | · ABNORMAL OPERATION IN CPU, ROM, RAM, ETC. (SUCH AS VOLTAGE DROP IN CPU) |
| C | · Tr OPERATES<br>· CLOCK FOR WDT IS PROVIDED<br>· SOFTWARE RUNS<br>· TEMPORARY ABNORMALITY | · COMMON NOISE (E.G. IN POWER SOURCE)<br>· ERROR IN SOFTWARE DESIGN (E.G. INDEFINED CONDITION) |

FIG. 9

WATCHDOG TIMER AND METHOD FOR DETECTING ABNORMAL OPERATION OF COMPUTER, AND COMPUTER INCLUDING THE TIMER

BACKGROUND OF THE INVENTION

1. Field of the Invention

The present invention relates to a watchdog timer and method for detecting abnormal operations of a computer. The present invention relates also to a computer including the watchdog timer for detecting abnormal operations of the computer.

2. Description of the Related Art

Computers may operate out of control or stop operating as a result of any of various factors, as described in FIG. 9.

Disclosed in Unexamined Japanese Patent Application KOKAI Publication No. S61-62947 is a method, employing a timer, for detecting such abnormal operations of computers and setting the computers back into a normal state.

The timer (watchdog timer) begins operating in accordance with commands of a software program for controlling a computer. The watchdog timer counts pulses of a clock, and the counted value is cleared at predetermined intervals under the control of the software program.

In the case where an abnormal operation occurs in the computer, the counted value exceeds a predetermined limit value instead of being cleared In the case where the counted value exceeds the limit value, the watchdog timer controls the computer to execute a reset process.

However, as described above, the watchdog timer begins operating by the commands of the software program. Hence, the abnormal operation occurring during the activation of the software program can not satisfactorily be detected.

Particularly, in the case where a noise N1 occurs in the power source as shown in FIG. 10, the computer is operated out of control, and the counted value reaches the limit value (C1). Hence, the computer is reset by the watchdog timer, and begins the reset process (C2). However, the noise N1 still remains at the time of beginning the reset process, the computer is again operated out of control. Thus, the software program is not activated, and the watchdog timer docs not operate, either.

Accordingly, the conventional watchdog timer can not detect the abnormal operations occurring in the computer during the activation of the software program.

In the case where the watchdog timer is included in the computer, the computer can not be employed for any apparatuses which do not need the functions of the watchdog timer. In other words, any of those computers each including the watchdog timer can not be used for various purposes.

The contents of Unexamined Japanese Patent Application KOKAI Publication No. S61-62947 are herein incorporated by reference in its entirety.

SUMMARY OF THE INVENTION

The present invention has been made in consideration of the above. It is accordingly an object of the present invention to provide a watchdog timer which can be used for various purposes.

Another object thereof is to provide a watchdog timer and method for reliably detecting abnormal operations of computers.

Still another object thereof is to provide a computer including the watchdog timer reliably detecting the abnormal operations of the computers.

In order to attain the above objects, according to the first aspect of the present invention, there is provided a computer comprising:

a controller which executes a reset process, in response to a reset signal;

an oscillator oscillates a clock; and a timer which counts pulses of the clock, and outputs the reset sisal to the controller, in a case where a counted value obtained by counting the pulses of the clock exceeds a predetermined limit value; and wherein the controller controls the timer, and clears the counted value before the counted value exceeds the limit value, and the timer begins counting the pulses of the clock in synchronization with that the controller begins the reset process, thereby detecting an abnormal operation occurring in the computer during execution of the reset process.

The timer may have a plurality of operational modes.

The controller may output a mode specification signal for specifying an operational mode or the timer, of the timer; and the timer may set an operational mode thereof; in accordance with the mode specification signal.

The timer may include a circuit, which sets the mode specification signal sent from the controller ineffective in response to setting of the operational mode of the timer.

The timer may further include a restriction circuit which restricts an allowable period of time the mode specification signal provided from the controller can be accepted.

In order to attain the above objects, according to the second aspect of the present invention there is provided a watchdog timer comprising:

a counter which counts pulses of a clock generated by an oscillator, and clears a counted value of the pulses, in response to a clear signal for designating to clear the counted value and being supplied from an external circuit; aid an output circuit which outputs a reset signal for designating to execute a reset process to the external circuit, in a case where the counted value exceeds a predetermined limit value, and wherein the counter clears the counted value and begins counting the pulses of the clock in response to the reset signal output from the output circuit thereby detecting an abnormal operation occurring in the external circuit during execution of the reset process.

The watchdog timer may have a plurality of operational modes.

The watchdog timer may further include a mode setting circuit which sets an operational mode of the watchdog timer, in accordance with a mode specification signal which specifies the operational mode and is provided from the external circuit.

The watchdog timer may further include a circuit which sets the mode specification signal sent from the external circuit ineffective, in response to setting of the operational mode of the watchdog timer.

The watchdog timer may further include a restriction circuit which restricts an allowable period of time the mode specification signal provided from the external circuit can be accepted.

In order Lo attain tie above objects, according to the third aspect of the present invention, there is provided an abnormal operation detection method comprising:

counting pulses of a clock generated by an oscillator;

clearing a counted value of the pulses, in response to a clear signal which is provided from an external circuit and designates to clear the counted value; and controlling the external circuit to execute a reset process, in a case where the counted value exceeds a predetermined limit value, and wherein the counting includes detecting an abnormal operation occurring in the external circuit during execution of the reset process, by counting the pulses of the clock in synchronization with that the external circuit begins the reset process.

BRIEF DESCRIPTION OF THE DRAWINGS

These objects and other objects and advantages of the present invention will become more apparent upon reading of the following detailed description and the accompanying drawings in which:

FIG. 9 is a diagram showing kinds of abnormal operations occurring in a computer.

DETAILED OF THE PREFERRED EMBODIMENTS

First Embodiment

A watchdog timer (WDT) according to the first embodiment of the present invention will now be explained with reference Lo the accompanying drawings.

The WDT according to the first embodiment is incorporated in a microcomputer.

The WDT according to this embodiment has a plurality of operational modes. Specifically, the WDT has a reset mode, a Non-Maskable Interrupt (NMI) mode and a stop mode.

In each of the reset mode and the NMT mode, the WDT detects any abnormal operations (operates out of control and stops operations, etc.). In the stop mode, the WDT does not operate.

The operational modes of the WDT are set in accordance with functions of the microcomputer. Specifically, the operational modes of the WDT are determined by a software program for controlling the microcomputer.

For example, in the case where the microcomputer is included in a device which does not use the functions of the WDT, the WDT is set in a stop mode. Because of the plurality of operational modes, the WDT can be incorporated into various microcomputers. In other words, the WDT of this embodiment and the microcomputer including this WDT can be used for various purposes.

Figure 1:
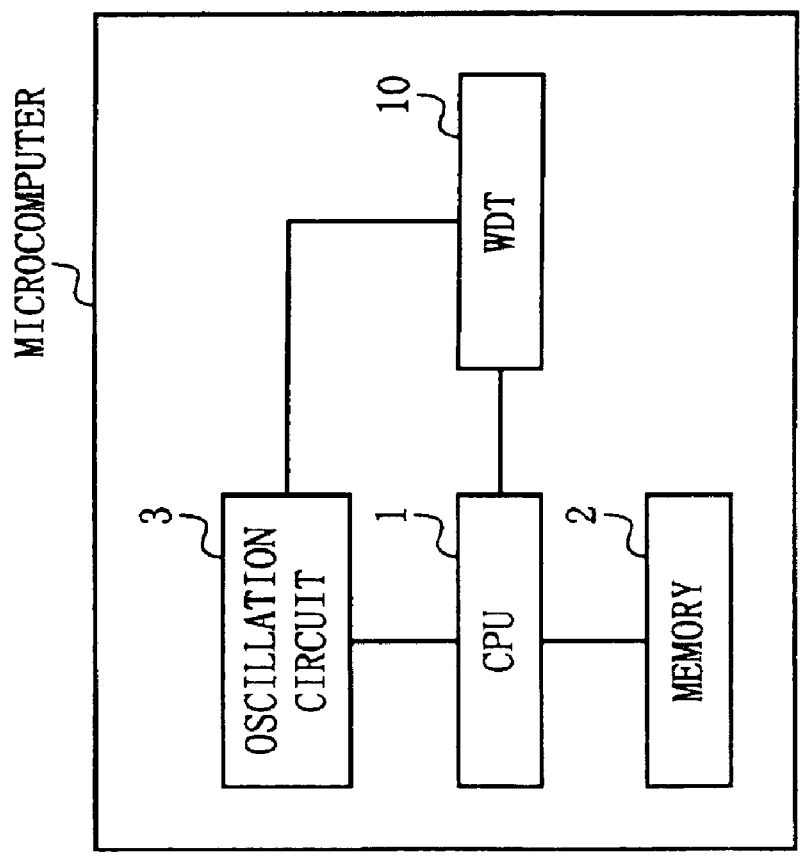
FIG. 1 is a diagram showing the structure of a microcomputer including a watchdog timer according to the first embodiment of the present invention.

FIG. 1 is a diagram showing the structure of the microcomputer including, the WDT of this embodiment.

As shown in FIG. 1, the microcomputer comprises a CPU (Central Processing Unit) 1, a memory 2, an oscillation circuit 3 and a WDT 10.

The CPU 1 operates in accordance with a software program stored in the memory 2 and a clock provided from the oscillation circuit 3. The CPU 1 sets the operational mode of the WDT 10 in accordance with the setting of the software program.

As described above, the WDT 10 does not operate in its stop mode.

In the reset mode and NMI mode, the WDT 10 counts pulses of the clock provided from the oscillation circuit 3. Before the counted value exceeds a predetermined limit value, the CPU 1 controls the WDT 10 to clear the counted value. In the case where the microcomputer (CPU 1) does not normally operate, the counted value is not cleared and exceeds the limit value.

In the case where the counted value exceeds the predetermined limit value, the WDT 10 causes the microcomputer (CPU 1) to execute the same initial process as that processed when the power is applied thereto, if the WDT 10 is in the reset mode. Further, if the WDT 10 is in the NMI mode, it causes the microcomputer to execute a predetermined NMT process. Then, the microcomputer gets back into a normal operation state.

Figure 2:
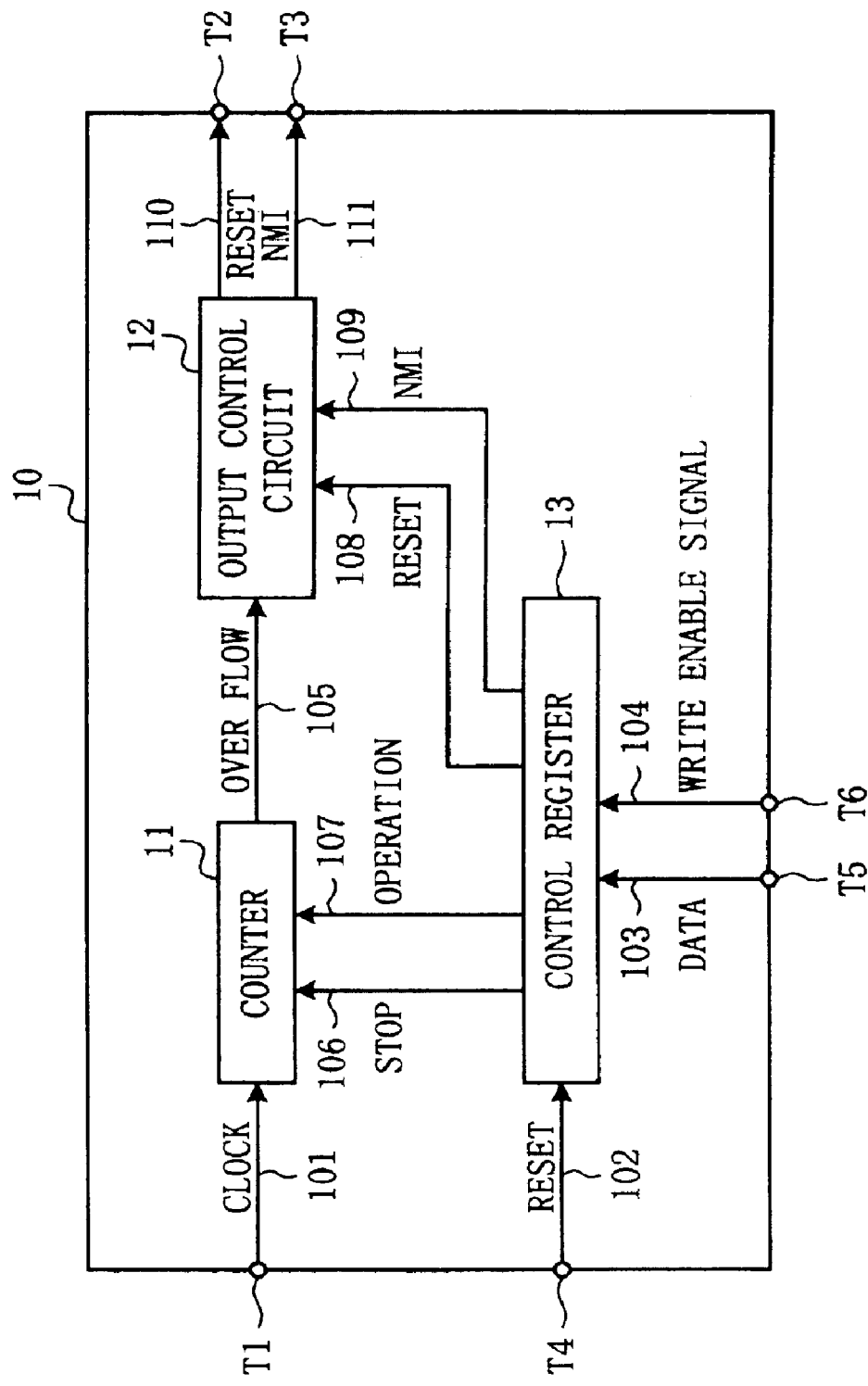
FIG. 2 is a diagram showing the structure of the watchdog timer included in the microcomputer of FIG. 1.

FIG. 2 is a diagram showing the structure of the WDT 10.

The WDT 10 comprises a counter 11, an output control circuit 12 and a control register 13. The WDT 10 has a plurality of terminals T1 to T6, and is connected to the CPU 1 and the oscillation circuit 3.

The counter 11 is connected to the oscillation circuit 3 via the terminal T1, and receives a clock 101 supplied from the oscillation circuit 3. The counter 11 counts pulses (clock pulses) of the clock 101, in accordance with a stop control signal 106 and operation control signal 107 supplied from the control register 13.

Particularly, in response to the operation control signal 107, the counter 11 clears the counted value and counts the pulses of the clock 101. In the case where the counted value exceeds the limit value, the counter 11 outputs an overflow signal 105 representing that the counted value has exceeded the limit value to the output control circuit 12. In response to the stop control signal 106, the counter 11 stops counting the pulses of the clock 101.

The output control circuit 12 is connected to the CPU 1 via the terminals T2 and T3. In response to the over-flow signal 105 output from the counter 11, the output control circuit 12 outputs a reset signal 110 or NMI signal 111 to the CPU 1.

The determination as to whether the reset signal 110 or the NMI signal 111 is output is made in accordance with a reset enable signal 108 and NMI enable signal 109 output from the control register 13 to the output control signal 12. For example, in the case where the reset enable signal 108 is at a low level and the NMI enable signal 109 is at a high level, the reset signal 110 is output from the output control circuit 12. On the contrary, in the case where the reset enable signal 108 is at a high level and the NMI enable signal 109 is at a low level, the NMI signal 111 is output from the output control circuit 12.

In response to the reset signal 10 output from the output control circuit 12, the CPU 1 carries out the same initial process as that performed at the time the power source is applied thereto. In response to the NMI signal 111 sent from the output control circuit 12, the CPU 1 carries out a predetermined NMI process. Having performed the above, the microcomputer is restored to its normal state.

The control register 13 is connected to the CPU 1 via the terminals T4, T5 and T6, and receives a reset signal 102, data 103 and a write enable signal 104 provided from the CPU 1.

The control register 13 is initialized upon reception of the reset signal 102 from the CPU 1. Specifically, in response to the reset signal 102 from the CPU 1, the control register 13 outputs the operation control signal 107 to the counter 11, and sets the WDT 10 into a reset mode.

Figure 3:
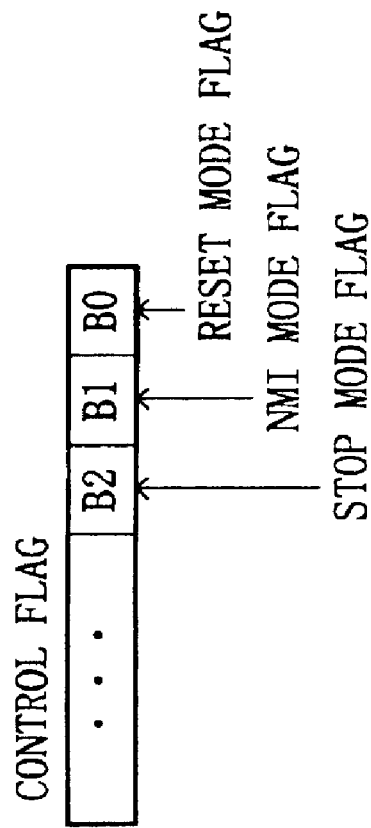
FIG. 3A is a diagram showing, a control flag that a control register of the watchdog timer shown in FIG. 2 has.
FIG. 3B is a diagram showing the relationship between operational modes of the watchdog timer and flags included in the control flag.

The control register 13 has a control flag shown in FIG. 3A, and sets each of flags (bit value) included in the control flag, in accordance with the data 103 and write enable signal 104. The control register 13 sets the WDT 10 into an operational mode, in accordance with the control flag.

FIG. 3B is a diagram showing the relationship between the flags included in the control flag and the operational modes of the WDT 10.

As shown in FIG. 3B, the operational modes of the WDT 10 are represented by three bits B0, B1 and B2.

In the case where the bit B0 is "0", the control register 13 outputs the operation control signal 107 to the counter It and sets the levels to the respective reset enable signal 108 and NMI enable signal 109, such that the output control circuit 12 outputs the reset signal 110. As a result of this, the WDT 10 is set into the reset mode. In this case, the counter 11 counts the pulses of the clock 101. Further, the output control circuit 12 outputs the reset signal 110, in the case where the counted value exceeds the limit value.

In the case where the bit B0 is "1" and the bit B1 is "0", the control register 13 outputs the operation control signal 107 to the counter 11 and sets the levels of the reset enable signal 108 and NMI enable signal 109, such that the output control circuit 12 outputs the NMI signal 111. As a result of this, the WDT 10 is set into the NMI mode. In this case, the counter 11 counts the pulses of the clock 101. Further, the output control circuit 12 outputs the NMI signal 111, in the case where the counted value exceeds the limit value.

In the case where the bit B0 and bit B1 are both "1" and the bit B2 is "0", the control register 13 outputs the stop control signal 106 to the counter 11. Then, the WDT 10 is set into tile stop mode. In this case, the counter 11 stops to operate.

The reset signal 102 can be supplied to the control register 13 from circuits other than the CPU 1. For example, the reset signal 110 output from the output control circuit 12 is supplied to the control register 13 as a reset signal 102. This reset signal 102 can be supplied also from a reset-signal output circuit (not illustrated) included in a device having the microcomputer. In response to user-pressing of a reset button set in the main body of the device, the reset-signal output circuit outputs the reset signal 102 to the CPU 1 and the control register 13.

In response also to the reset signal 102 sent from the reset-signal output circuit, the CPU 1 carries out the same initial process as that performed just when the power source is applied thereto. The control register 13 can be initialized in response to the reset signals 102 sent from the output control circuit 12 and reset-signal output circuit.

The initial process which is carried out in response to the reset signal 110 output by the output control circuit 12 will hereinafter referred to as internal resetting, while the initial process which is carried out in response to the reset signal 102 output by the reset-signal output circuit will referred to as external resetting.

Figure 4:
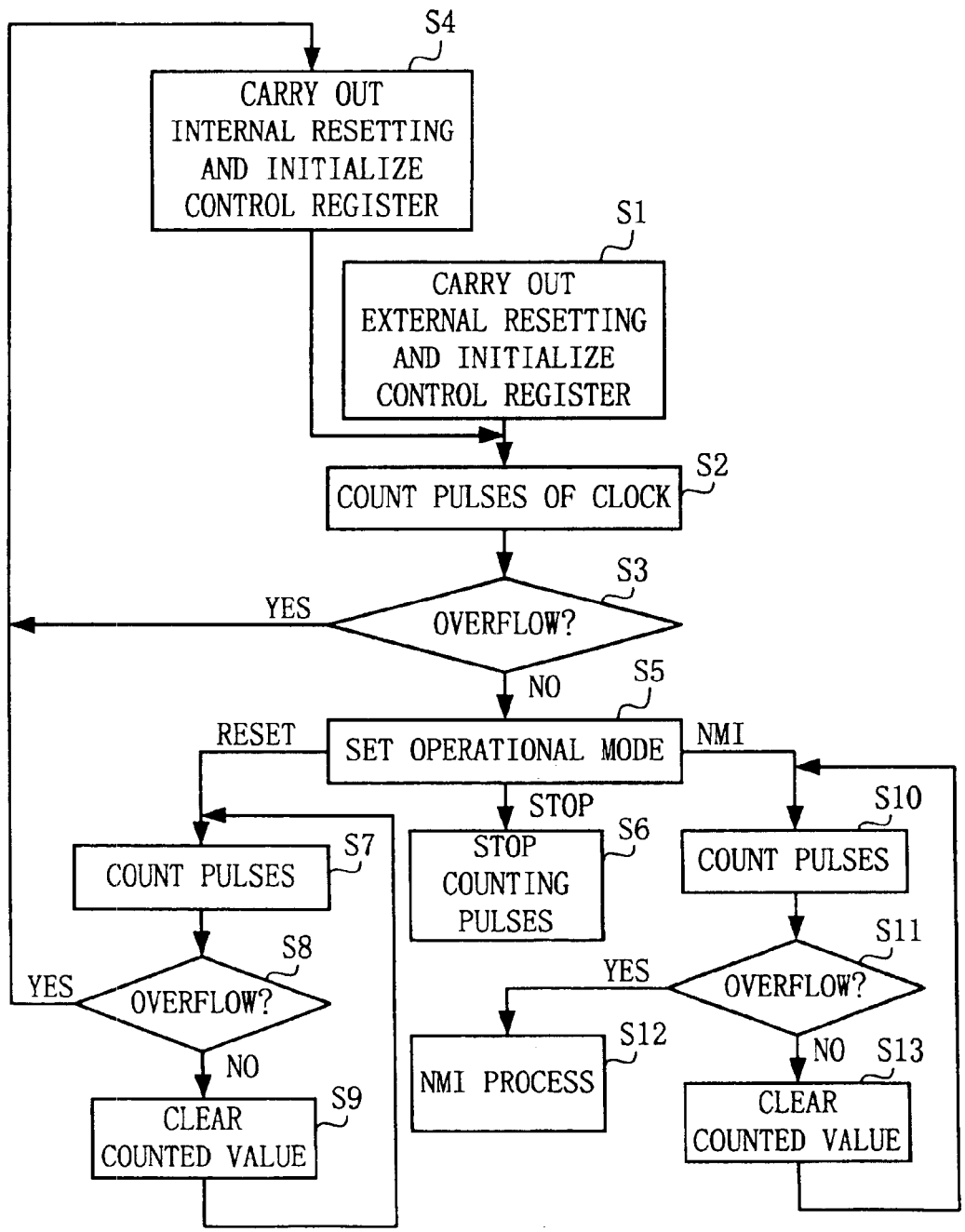
FIG. 4 is a flowchart showing operations of the microcomputer for detecting an abnormal operation of the microcomputer.

Operations for detecting an abnormal operation of the microcomputer (the CPU 1) will now be described with reference to FIG. 4.

For example, a user of the device including the microcomputer presses a "reset" button set in the main body of the device. Upon this, the reset signal 102 is supplied from the reset-signal output circuit to the CPU 1 and the control register 13.

The CPU 1 carries out the external resetting in response to the reset signal 102 from the reset-signal output circuit, while the control register 13 is initialized in response to the reset signal 102 (Step S1).

The CPU 1 reactivates the software program stored in the memory 2, in the external resetting (the initial process). The initialized control register 13 outputs the operation control signal 107 to the counter 11, and sets the WDT 10 into the reset mode.

In response to the operation control signal 107 output from the control register 13, the counter 11 clears the counted value and counts the pulses of the clock 101 provided from the oscillation circuit 3 (Step S2).

The CPU 1 outputs the reset signal 102 for clearing he counted value to the control register 13, in accordance with commends of the activated software program. The CPU 1 outputs the data 103 and write enable signal 104 for setting the operational mode of the WDT 10 to the control register 13, in accordance with the setting of the activated software program.

In the case where the microcomputer normally operates, the CPU 1 carries out the above procedures. Hence, the counted value does not exceed the limit value (Step S3; NO).

In the case where an abnormal operation occurs in the microcomputer during the activation of the software program, the CPU 1 does not carry out the above procedures. Hence, the counted value exceeds the limit value (Step S3; YES).

In the case where the counted value exceeds the limit value, the counter 11 outputs the over-flow signal 105 to the output control circuit 12. In response to the over-flow signal 105, the output control circuit 12 outputs the reset signal 110 to the CPU 1 and the control register 13.

In response to the reset signal 110 from the output control circuit 12, the CPU 1 carries out the internal resetting he control register 13 is initialized in response to the reset signal 110 (the reset signal 102) (Step S4). Upon this, the above-described procedure of the step S2 is executed In the internal resetting (the initial process), the CPU 1 reactivates the software program stored in the memory 2. The initialized control register 13 outputs the operation control signal 107 to the counter 11 to set the WDT 10 into the reset mode, as described above.

In the case where the microcomputer normally operates, the CPU 1 outputs, as described above, the reset signal 102, the data 103 and the write enable signal 104, to the control register 13.

The control register 13 sets the operational mode of the WDT 10, in accordance with the reset signal 102, the data 103 and the write enable signal 104 (Step S5).

In the case where the operational mode of the WDT 10 is the stop mode (Step S5; STOP), the counter 11 stops counting the pulses of the clock 101, in response to the stop control signal 106 supplied from the control register 13 (Step S6).

In the case where the operational mode of the WDT 10 is the reset mode (Step S5; RESET), the counter 11 clears the counted value in response to the operation control signal 107 supplied from the control register 13, and counts the pulses of the clock 101 supplied from the oscillation circuit 3 (Step S7).

Even after the operational mode of the WDT 10 is set, the CPU 1 outputs the reset signal 102 for clearing the counted value to the control register 13, in accordance with the commands of the software program. At this time, the control register 13 is initialized in response to the reset signal 102. Hence, the CPU 1 outputs the data 103 and the write enable signal 104 for maintaining the operational mode of the WDT 10 together with the reset signal 102, to the control register 13.

While the microcomputer normally operates, the CPU 1 repeats the above procedures, so that the counted value does not exceed the limit value (Step S8; NO).

On the contrary, in the case where there is an abnormal operation occurring in the microcomputer, the CPU 1 does not execute the above procedures. Hence, the counted value exceeds the limit value (Step S8; YES).

In the case where the counted value exceeds the limit value, the counter 11 outputs the over-flow signal 105 to the output control circuit 12. In response to the over-flow signal 105, the output control circuit 12 outputs the reset signal 110 to the CPU 1 and control register 13. As a result of this, the above-described procedure of the step S4 is executed.

In the case where the microcomputer normally operates, the control register 13 outputs the operation control signal 107 to the counter, in response to the reset signal 102 supplied from the CPU 1. Then, the counter 11 clears the counted value (Step S9), and the flow returns to the procedure of the step S7.

In the case where the operational mode of the WDT 10 which is set in the step S5 is the NMI mode (Step S5; NMI), the counter 11 scars the counted value, in response to the operation control signal 107 supplied from the control register 13, and counts the pulses of the clock 101 supplied from the oscillation circuit 3 (Step S10).

As explained above, even after the operational mode of the WDT 10 is set, the CPU 1 outputs the reset signal 102 for clearing the counted value, and the data 103 and write enable signal 104 for maintaining the operational mode of the WDT 10 to the control register 13, in accordance with the software program.

While the microcomputer normally operates, the CPU 1 repeats the above procedures, so that the counted value does not exceed the limit value (Step S11; NO).

In the case where there is an abnormal operation occurring in the microcomputer, the CPU 1 does not execute the above procedures. Hence, the counted value exceeds the limit value (Step S11; YES).

In the case where the counted value exceeds the limit value, the counter 11 outputs the over-flow signal 105 to the output control circuit 12, likewise the above. In response to the over-flow signal 105, the output control circuit 12 outputs the NMI signal 111 to the CPU 1. Upon this, the CPU 1 carries out a predetermined NMI process (Step S12).

In the case where the microcomputer normally operates, the control register 13 outputs the operation control signal 107 to the counter 11, in response to the reset signal 102 supplied from the CPU 1. Upon this, the counter 11 clears the counted value (Step S13), and the low returns to the procedure of the step S10.

Accordingly, the WDT 10 operates in response to, not only the reset signal 102 output by the CPU 1, but the reset signals 102 and 110 for setting the microcomputer (the CPU 1). In other words, the WDT 10 begins operating in synchronization with that the microcomputer (the CPU 1) begins the initial process (reset process). Thus, the WDT 10 can set the operations of the microcomputer back into a normal state, even if there is an abnormal operation occurring in the microcomputer during the activation of the software program.

Figure 5:
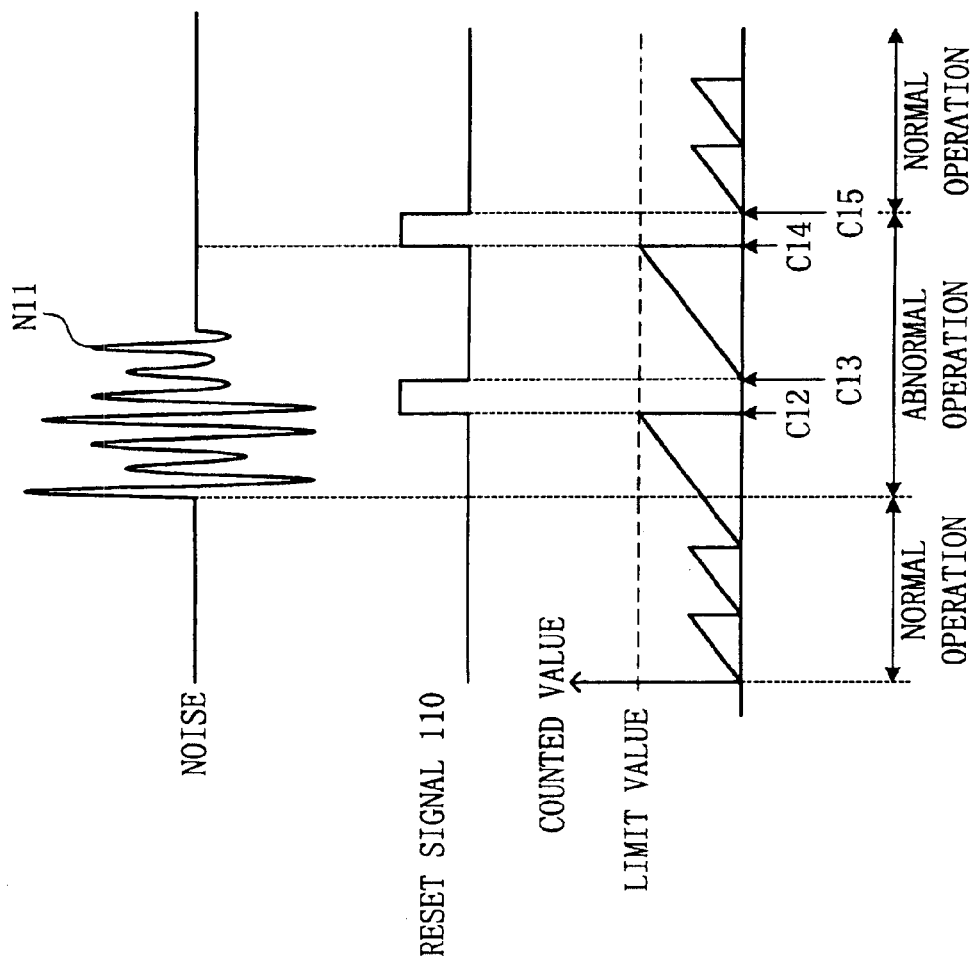
FIG. 5 is a diagram showing the relationship between the abnormal operations of the microcomputer and the operations of the watchdog timer.

As shown in FIG. 5, a noise N11 in a power source causes an abnormal operation of the microcomputer. In the case where the microcomputer does not normally operate, the CPU 1 does not output the reset signal 102, so the counted value reaches the limit value (C12).

If the counted value exceeds the limit value, the output control circuit 12 outputs the reset signal 110 to the CPU 1 and the control register 13, as described above. Upon this, the CPU 1 begins the internal resetting, and the counter 11 clears the counted value (C13) and continues counting the pulses of the clock 101.

If the noise N11 remains in the power source even after the beginning of the internal resetting, the abnormal operation of the microcomputer occurs again. Hence, the counted value reaches the limit value again (C14).

Likewise the above, the internal resetting begins, and the counted value is cleared (C15). At this time, if the noise N11 is removed therefrom, the microcomputer normally operates, and hence completing the internal resetting. In addition, the counted value is cleared before reaching the limit value.

Accordingly, the WDT 10 functions immediately after the beginning of the internal resetting (or the external resetting). Hence, the WDT 10 can detect the abnormal operation which occurs in the microcomputer immediately after the beginning of the internal resetting (or the external resetting). As it result, operations of the microcomputer can be set back into the normal state.

In the case where the abnormal operation occurs in the microcomputer, error data 103 and error write enable signal 104 may be provided from the CPU 1 to the control register 13.

As explained above, the operational mode of the WDT 10 is set in accordance with the data 103 and write enable signal 104. Hence, in the case where the abnormal operation occurs in the microcomputer, the operational mode of the WDT 10 may unintentionally be switched into another operational mode.

If the operational mode of the WDT 10 is switched into the stop mode, the abnormal operational of the microcomputer can not be detected. In other words, the microcomputer can not get back into a normal operation state.

To avoid the above problems, the control register 13 may include a circuit for setting the write enable signal 104 inactive after having set the operational mode of the WDT 10.

Explanations will now be made to an example of a flag setting circuit for setting a reset mode flag (value of the bit B0) included in the control flag shown in FIG. 3A.

Figure 6:
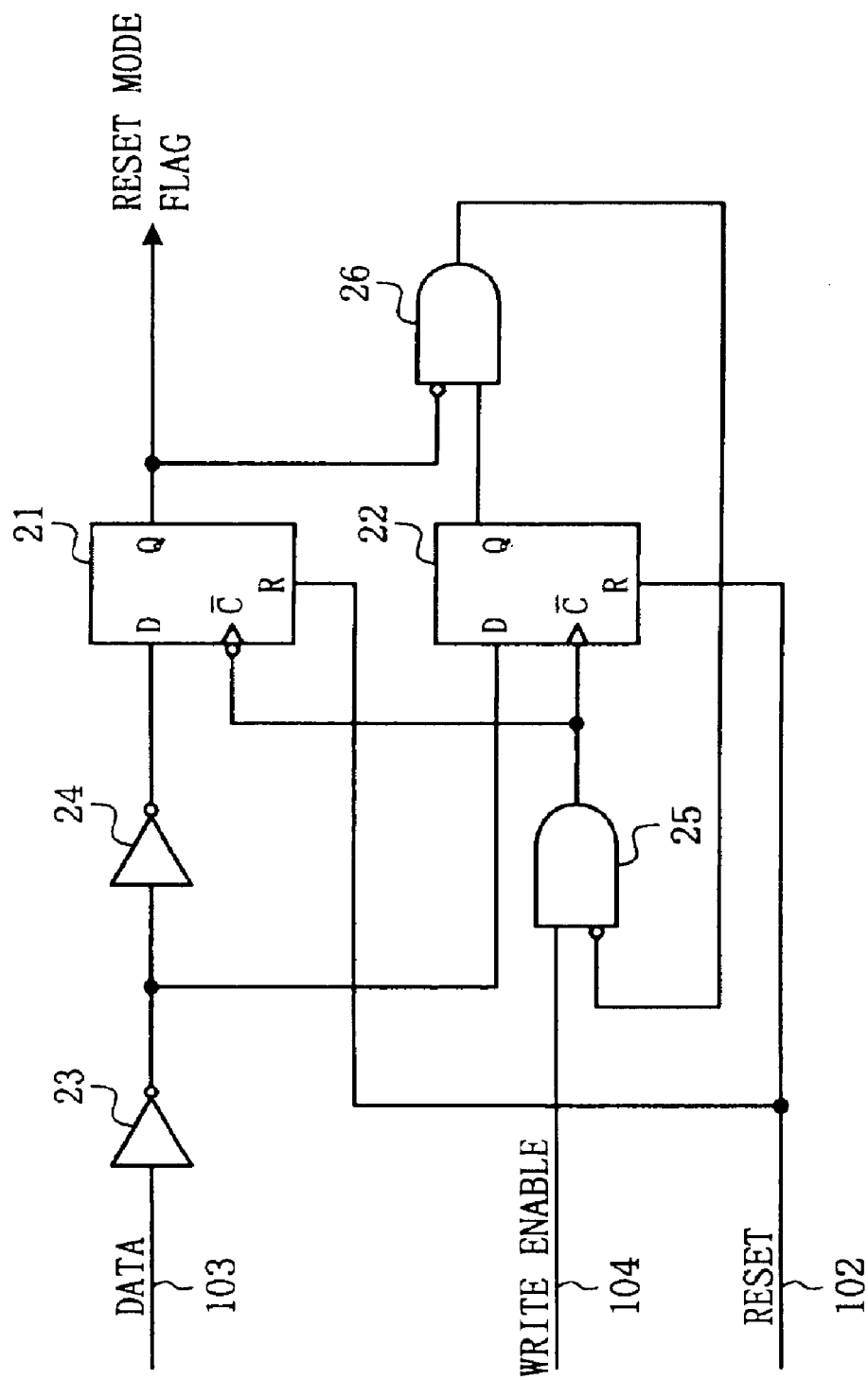
FIG. 6 is a diagram showing a flag setting circuit included in the control register of the watchdog timer.

The flag setting circuit comprises, as shown in FIG. 6, the first flop-flop (F/F) 21, the second F/F 22, the first inverter 23, the second inverter 24, the first AND gate 25 and the second AND gate 26.

The reset signal 102 is input to reset terminals of the respective first and second F/F 21 and 22.

The data 103 is reversed by the first inverter 23, further reversed by the second inverter 24, and then input to a data input-terminal of the first F/F 21. The data 103 having being reversed by the fist inverter 23 is input to a data input-terminal of the second F/F 22.

The write enable signal 104 is input to the first AND gate 25. The first AND gate 25 outputs a logical product of the write enable signal 104 and a reverse signal of the signal output from the second AND gate 26, to clock terminals of the respective first F/F 21 and second F/F 22. Note, in this case, that the clock terminal of the first F/F 21 receives the signal which has been reversed and output from the first AND gate 25, and that the clock terminal of the first F/F 22 receives the signal as is from the first AND gate 25.

The output signals of the first F/F 21 and 22 are input to the second AND gate 26. The output signal of the first F/F 21 is reversed and then input to the second AND gate 26, whereas the output signal of the second F/F 22 is input to the second AND gate 26 as is.

The reset-mode flag (the value of the bit B0) is set based on the output signal of the first F/F 21.

According to the above structure, the first F/F, 21 and second F/F 22 are reset in accordance with the reset signal 102. If the first F/F 21 and second F/F 2 are reset, the outputs of the first F/F 21 and second F/F 22 will be "0". In this case, the output of the second AND gate 26 is "0", and the write enable signal 104 is effective.

In such circumstances, if the rising edge of the write enable signal 104 is input to the first AND gate 25, the level of the signal output from the first F/F 21 is set to the level of the data 103, in synchronization with the input timing of this rising edge.

In the case where the WDT 10 is set into the reset mode, the output of the F/F 21 is set to "0". In this ease, the output of the second F/F 22 will be "1", and the output of the second AND gate 26 will be "1". Then, the write enable signal 104 will be ineffective.

In the structure wherein the control register 13 includes the above-described circuit which sets the write enable signal 104 ineffective after setting the operational mode of the WDT 10, i.e. setting the control flag, it can be preventable that the operational mode of the WDT 10 is switched to another mode as a result of an abnormal operation of the microcomputer.

Second Embodiment

A WDT according to the second embodiment of the present invention will now be described with reference to the accompanying drawings.

Likewise the first embodiment, the WPT according to the second embodiment is incorporated into a microcomputer, and has a plurality of operational modes.

Likewise the first embodiment, the microcomputer comprises the CPU 1, the memory 2, the oscillation circuit 3 and a WDT 30 according to the second embodiment.

Figure 7:
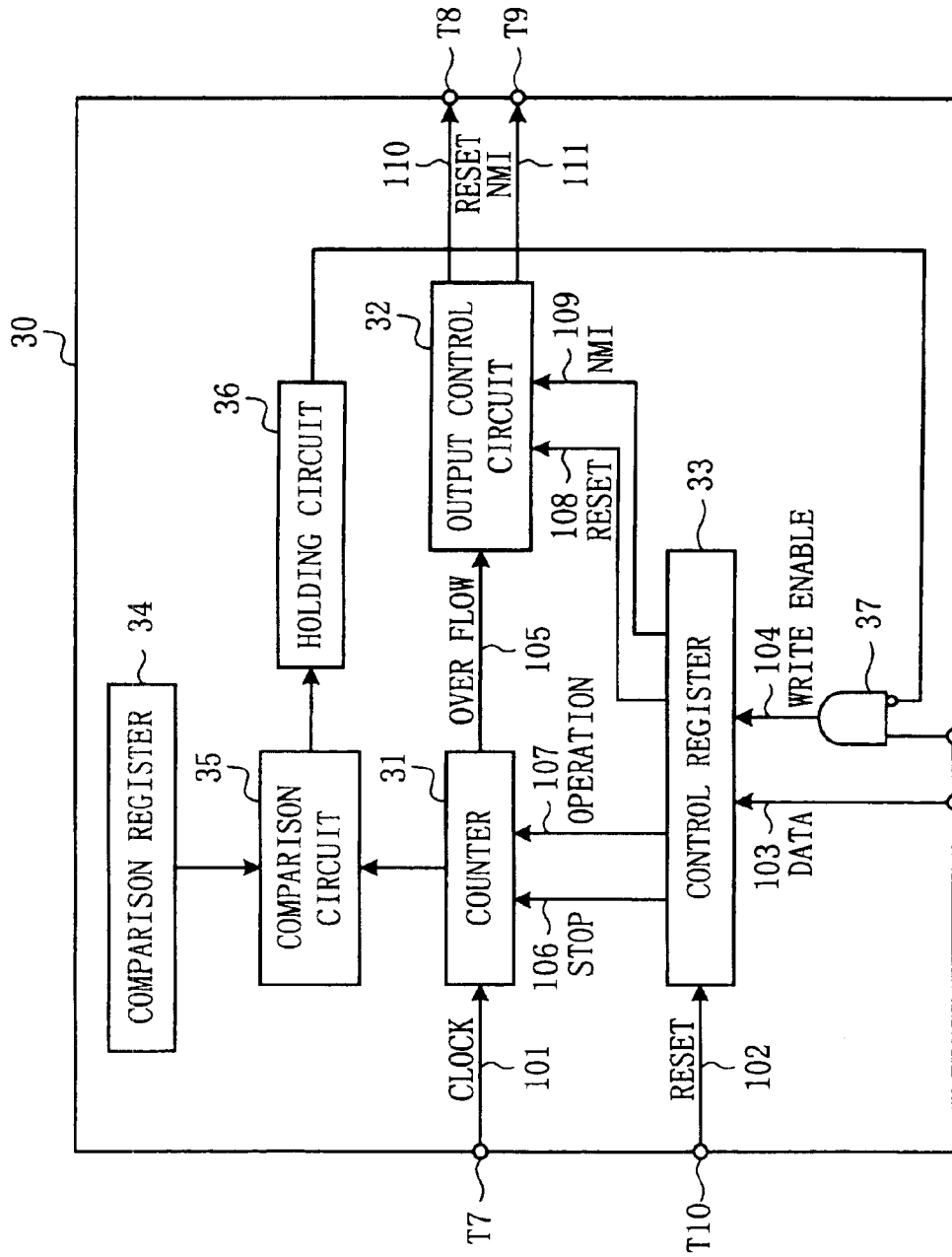
FIG. 7 is a diagram showing the stricture of a watchdog timer according to the second embodiment of the present invention.

As shown in FIG. 7, the WDT 30 comprises a counter 31, an output control circuit 32, a control register 33, a comparison register 34, a comparison circuit 35, a holding circuit 36 and an ANI) gate 37. The WDT 30 has terminals T7 to T12, and is connected to the CPU 1 and oscillation circuit 3.

The counter 31, the output control circuit 32 and control register 33 are substantially the same as the counter 11, the output control circuit 12 and the control register 13 included in the WDT 10 of the first embodiment. Note, however, that the counter 31 outputs the counted value to the comparison circuit 35.

The comparison register 34 stores a threshold value which is smaller than a predetermined limit value, and outputs a signal representing the threshold value to the comparison circuit 35.

The comparison circuit 35 compares the counted value sent from the counter 31 and the threshold value sent from the comparison register 34. The comparison circuit 35 outputs a result of the comparison to the holding circuit 36. Specifically, the comparison circuit 35 outputs "0" in the case where the counted value is smaller than the threshold value, and outputs "1" its the case where the counted value is equal to or larger than the threshold value.

The holding circuit 36 holds the output of the comparison circuit 35, and outputs the held output to the AND gate 37. At this time, the output of the holding circuit 35 is reversed and then input to the AND gate 37.

The AND gate 37 outputs a logical product of the write enable signal 104 provided from the CPU 1 and a reverse signal of the signal provided from the holding circuit 36, to the control register 33.

According to the above structure, if the counted value is equal to or larger than the threshold value, the write enable signal 104 provided from the CPU 1 will be ineffective. In other words, if a predetermined allowable period, since the counted value is cleared until the counted value reaches the threshold value, elapses, the write enable signal 104 will not be provided to the control register 33. Thus, even before the operational mode of the WDT 30 is set, it can certainly be avoided that the operational mode of the WDT 30 is switched to another mode as a result of an abnormal operation of the microcomputer. As a result of this, the operation of the microcomputer can surely be detected.

Figure 8:
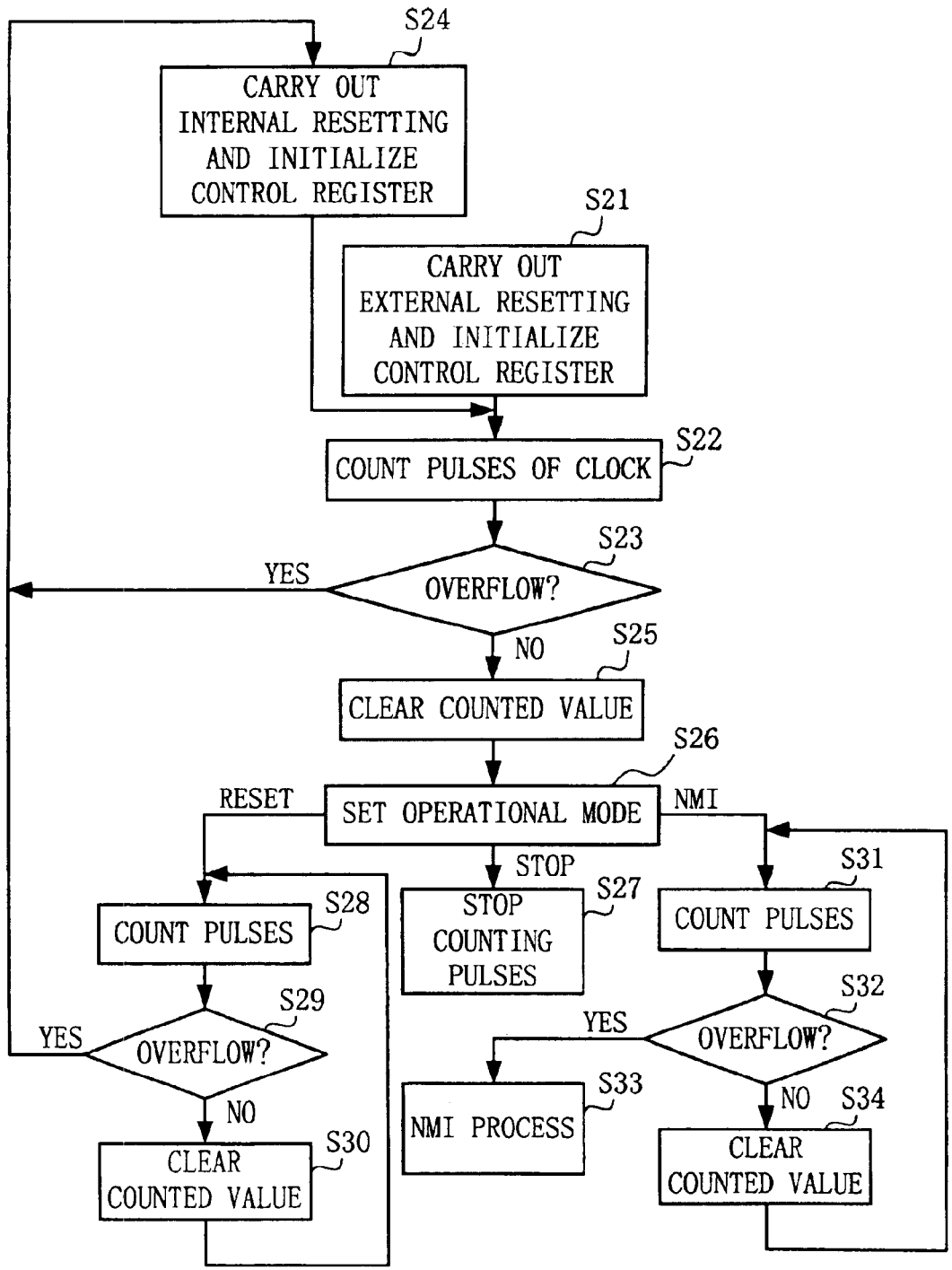
FIG. 8 is a flowchart showing operations of a microcomputer for detecting an abnormal operation of the microcomputer.
Figure 10:
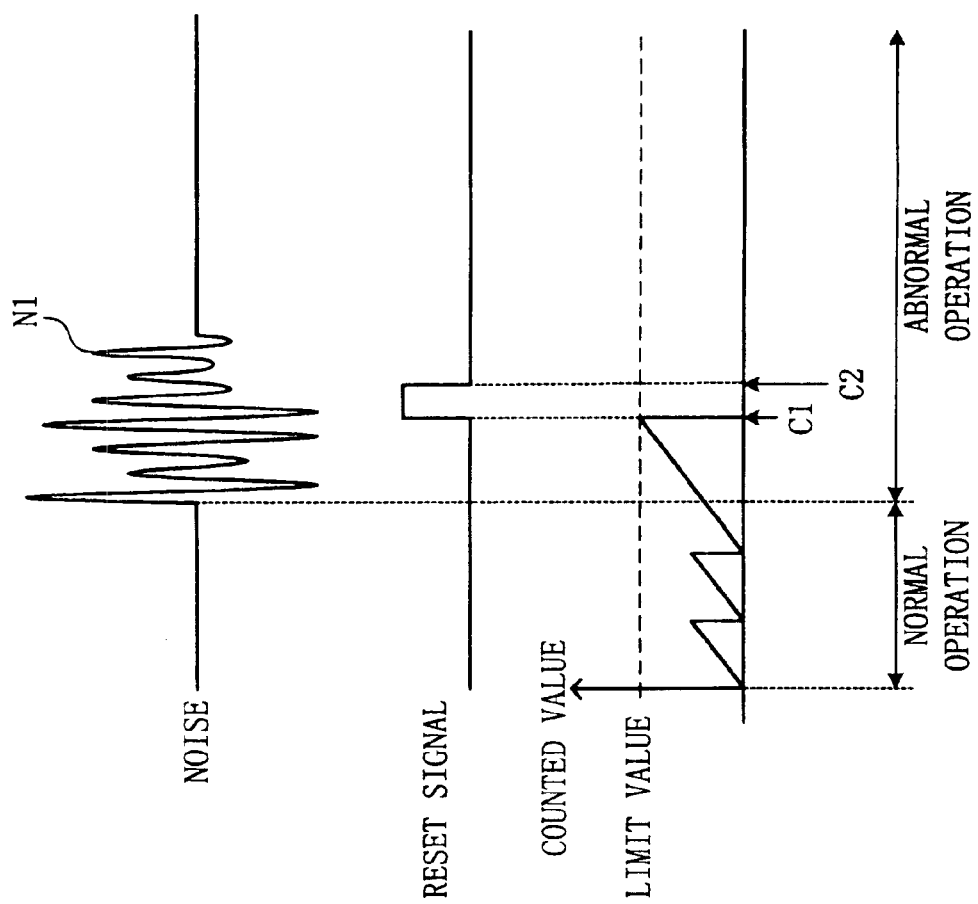
FIG. 10 to is a diagram showing the relationship between abnormal operations of the microcomputer and operations of a conventional watchdog timer.

Operations of the microcomputer for detecting abnormal operations of the microcomputer will now be explained with reference to FIG. 8.

Those procedures (Steps S21 to S24) to be executed during the activation of the software program stored in the memory 2 are substantially the same as those explained in the first embodiment. Note, however, that if the predetermined allowable period elapses, the write enable signal 104 provided from CPU 1 will be ineffective, as explained above.

As depicted earlier, in the case where the microcomputer normally operates, the CPU 1 sets the operational mode of the WDT 30 in accordance with the setting of the activated software program.

After the elapse of the predetermined allowable period, the write enable signal 104 is being ineffective. Thus, the CPU 1 outputs the reset signal 102 to the control register 33 to set the write enable signal 104 effective, and hence clearing the counted value (Step S25).

If the counted value is cleared, i.e. the counted value is smaller than the threshold value the comparison circuit 35 outputs "0" to the holding circuit 36. As a result of this, the write enable signal 104 will be effective.

The CPU 1 outputs the data 103 and write enable signal 104 for setting the operational mode of the WDT 30 to the control register 33, in accordance with the activated software program.

The control register 33 sets the operational mode of the WDT 30, in accordance with the data 103 and write enable signal 104, likewise the case of the first embodiment (Step S26).

Those procedures (Steps S27 to S34) after the operational mode of the WDT 30 is set are substantially the same as those of the first embodiment. Note, however, that if the predetermined allowable period elapses, the write enable signal 104 provided from the CPU 1 will be ineffective, as described above.

Accordingly, it can surely be avoided that the operational mode of the WDT 30 is switched to another mode as a result of an abnormal operation of the microcomputer, by setting a period of time the write enable signal 104 is effective, i.e. by setting a period of time the operational mode of the WDT 30 can be set.

Likewise the first embodiment, the WDT 30 can operate in accordance with not only the reset signal 102 output by the CPU 1, but also the reset signals 102 and 110 for resetting the microcomputer (the CPU 1). Thus, even if an abnormal operation occurs in the microcomputer during the activation of the software program, the WDT 30 can set the operations of the microcomputer back into a normal state.

The control register 33 included in the WDT 30 may include a flag setting circuit described in the first embodiment.

The apparatus of the present invention can be realized by a general computer, without the need for a dedicated system. A program and data for controlling a computer to execute the above-described procedures may be recorded on a medium (a floppy disk, CD-ROM, DVD) or the like) and distributed, and the program may be installed into the computer and run on an OS (Operating System) to execute the above-described processes, thereby achieving the apparatus of the present invention. The above program and data may be stored in a disk device or the like in the server device on the Internet, and embedded in a carrier wave. The program and data embedded in the carrier wave may be downloaded into the computer so as to realize the apparatus or the present invention.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-390716 filed on Dec. 22, 2000, and including specification, claims, drawings and summary. The disclosure of the above Japanese Patent Application is incorporated herein by reference in its entirety.

What is claimed is:

1. A computer comprising:

a controller which executes a reset process, in response to a reset signal;

an oscillator oscillates a clock; and a timer which counts pulses of the clock, and outputs the reset signal to said controller, in a case where a counted value obtained by counting the pulses of the clock exceeds a predetermined limit value, wherein said controller controls said timer, and clears the countered value before the counted value exceeds the limit values and said timer begins counting the pulses of the clock in synchronization with that said controller be the reset process, thereby detecting an abnormal operation occurring in the computer during execution of the reset process, said timer has a plurality of operational modes, said controller outputs a mode of specification signal for specifying an operation mode of said timer, and wherein said timer sets an operational mode thereof, in accordance with the mode specification signal, and said timer includes a circuit, which sets the mode specification sign sent from said controller ineffective in response to setting of the operational mode of said timer.

2. A computer comprising:

a controller which executes a reset process, in response to a reset signal;

an oscillator oscillates a clock; and a timer which counts pulses of the clock, and outputs the reset signal to said controller, in a case where a counted value obtained by counting the pulses of the clock exceeds a predetermined limit value, wherein said controller controls said timer, and clears the countered value before the counted value exceeds the limit values and said timer begins counting the pulses of the clock in synchronization with that said controller begins the reset process, thereby detecting an abnormal operation occurring in the computer during execution of the reset process, said timer has a plurality of operational modes, said controller outputs a mode of specification signal for specifying an operation mode of said timer, and wherein said timer further includes a restriction circuit which restricts an allowable period of time the mode specification signal provided from said controller can be accepted.

3. The computer according to claim, 1 wherein said timer further includes a restriction circuit which restricts an allowable period of time the mode specification signal provided from said controller can be accepted.

4. A watchdog timer comprising:

a counter which counts pulses of a clock generated by an oscillator, and clears a counted value of the pulses, in response to a clear signal for designating to clear the counted value and being supplied from an external circuit;

an output circuit which outputs a reset signal for designating to execute a reset process to said external circuit, in a case where the counted value exceeds a predetermined limit value;

a mode setting circuit which sets an operational mode of said watchdog timer, in accordance with a mode specification signal which specifies the operational mode and is provided from said external circuit; and a circuit which sets the mode specification signal sent from said external circuit ineffective, in response to setting of the operational mode of said watchdog timer, wherein said counter clears the counted value and beans counting the pulse of the clock in response to the reset signal output from said output circuit, thereby detecting an abnormal operation occurring in said external circuit during execution of the reset process, and said watchdog timer has a plurality of operational modes.

5. A watchdog timer comprising:

a counter which counts pulses of a clock generated by an oscillator, and clears a counted value of the pulses, in response to a clear signal for designating to clear the counted value and being supplied from an external circuit;

an output circuit which outputs a reset signal for designating to execute a reset process to said external circuit, in a case where the counted value exceeds a predetermined limit value;

a mode setting circuit which sets an operational mode of said watchdogs timer, in accordance with a mode specification signal which specifies the operational mode and is provided from said external circuit; and a restriction circuit which restricts an allowable period of time the mode specification signal provided from said external circuit can be accepted, wherein said counter clears the counted value and begins counting the pulse of the clock in response to the reset signal output from said output circuit, thereby detecting an abnormal operation occurring in said external circuit during execution of the reset process, and said watchdog timer has a plurality of operational modes.

6. The watchdog timer according to claim 4, further including a restriction circuit which restricts an allowable period of time the mode specification signal provided from said external circuit can be accepted.

7. An abnormal operation detection method comprising:

counting pulses of a clock generated by an oscillator;

clearing a counted value of the pulses in response to a clear signal which is provided from an external circuit and designates to clear the counted value;

controlling said external circuit to execute a reset process, in a where the counted value exceeds a predetermined limit value;

setting the mode specification signal which is provided from said external circuit ineffective, in response to setting of the mode, wherein said counting includes detecting an abnormal operation occurring in said external circuit during execution of the reset process, by counting the pulses of the clock in synchronization with that said external circuit be the reset process and wherein said detection method includes a plurality of modes.

8. An abnormal operation detection method comprising:

counting pulses of a clock generated by an oscillator;

clearing a counted value of the pulses, in response to a clear signal which is provided from an external circuit and designates to clear the count value;

controlling said external circuit to execute a reset process, in a case where the counted value exceeds a predetermined limit value;

restricting an allowable period of time the mode specification signal provided from said external circuit can be accepted, wherein said counting includes detecting an abnormal operation occurring in said external circuit during execution of the reset process, by counting the pulse of the clock in synchronization with that said external circuit begins the reset process an wherein said detection method includes a plurality of modes.

9. The detection method according to claim 7, further including restricting an allowable period of time the mode specification sign provided from said external circuit can be accepted.

* * * * *